United States Patent
Critchley et al.

(10) Patent No.: US 11,279,403 B2
(45) Date of Patent: Mar. 22, 2022

(54) DRIFT STABILIZATION SYSTEM AND METHOD FOR VEHICLES AND TRAILER REVERSE ASSIST SYSTEMS WHILE STRAIGHT LINE BACKING OF TRAILER

(71) Applicant: Continental Automotive Systems, Inc., Auburn Hills, MI (US)

(72) Inventors: James Hockridge Critchley, Lake Orion, MI (US); Nizar Ahamed, Farmington Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 325 days.

(21) Appl. No.: 16/663,536

(22) Filed: Oct. 25, 2019

(65) Prior Publication Data
US 2021/0122415 A1 Apr. 29, 2021

(51) Int. Cl.
*B62D 15/02* (2006.01)
*B62D 5/00* (2006.01)
*B62D 6/00* (2006.01)
*B62D 13/06* (2006.01)

(52) U.S. Cl.
CPC .......... *B62D 15/025* (2013.01); *B62D 5/003* (2013.01); *B62D 6/002* (2013.01); *B62D 13/06* (2013.01)

(58) Field of Classification Search
CPC ...... B62D 15/025; B62D 5/003; B62D 6/002; B62D 13/06; B62D 15/0285
See application file for complete search history.

(56) References Cited

U.S. PATENT DOCUMENTS

| 9,248,858 | B2 | 2/2016 | Lavoie et al. | |
| 2015/0210317 | A1* | 7/2015 | Hafner | B62D 15/0275 701/41 |
| 2017/0073005 | A1 | 3/2017 | Ghneim et al. | |
| 2019/0092388 | A1* | 3/2019 | Raad | B62D 15/024 |
| 2020/0017143 | A1* | 1/2020 | Gali | B62D 15/028 |
| 2021/0078634 | A1* | 3/2021 | Jalalmaab | B60R 1/003 |

FOREIGN PATENT DOCUMENTS

JP    H10264839 A    10/1998

OTHER PUBLICATIONS

International Search Report and the Written Opinion of the International Searching Authority dated Jan. 26, 2021 for the counterpart PCT Application No. PCT/US2019/054766.

* cited by examiner

*Primary Examiner* — Sze-Hon Kong

(57) ABSTRACT

A trailer reverse assist system includes a coupler angle detection sensor to detect a zero degree angle of the trailer relative to the vehicle. A drift controller receives signals from vehicle dynamics sensors. The drift controller is electrically connected with a trailer reverse assist module. When the vehicle is backing up the trailer on the intended straight line implied path and since the coupler angle sensor, detecting the zero degree angle, is not perfectly calibrated, based in the signals from the vehicle dynamics sensors, the drift controller 1) estimates a distance that the trailer has drifted from the straight line desired path and 2) in a closed-loop feedback manner, provides a drift correction signal to the trailer reverse assist module for modifying the value of the zero degree angle and thus cause adjustment of the steering system to realign the trailer towards the straight line implied path without manual steering intervention.

10 Claims, 6 Drawing Sheets

_US 11,279,403 B2_

DRIFT STABILIZATION SYSTEM AND METHOD FOR VEHICLES AND TRAILER REVERSE ASSIST SYSTEMS WHILE STRAIGHT LINE BACKING OF TRAILER

FIELD

The invention relates to vehicle trailer reverse assist systems and, more particularly, to a drift stability system and method for real-time control and correction of trailer drift while the trailer moves in reverse in an implied straight line path.

BACKGROUND

Reversing a vehicle with a connected trailer is a nontrivial and counter intuitive process which often frustrates consumers and poses challenges while attempting to maneuver trailers into tight spots. Drivers are often confused as to which way to turn the vehicle's steering wheel to get the desired change in direction of the trailer. The recent addition of Trailer Reverse Assist (TRA) type functions remedies this situation by allowing the driver/operator to steer the trailer directly with the vehicle while backing. However, with reference to FIG. 1, the control system in a vehicle 10 enabling Trailer Reverse Assist functions are prone to small errors during straight line backing of a trailer 12, which may result in large drift of the trailer 12 from the implied/expected/desired backing direction. With reference to FIG. 2, this drift must be periodically and manually adjusted by the driver and is a noticeable inconvenience as it interrupts the smooth and intuitive operation of the system. Note that in FIG. 2, the Y-scale is exaggerated for description clarity.

Thus, there is a need to provide a system and method that removes such drift and is also able to provide real-time updates to the calibration of TRA type systems to further mitigate drift.

SUMMARY

An object of the invention is to fulfill the need referred to above. In accordance with the principles of a present embodiment, this objective is achieved by providing a trailer reverse assist system for vehicle straight line backing-up of a trailer connected to the vehicle via a coupler. The vehicle has a steering system and vehicle dynamics sensors for detecting vehicle operating parameters. The system includes a coupler angle detection sensor constructed and arranged to detect a zero-degree angle of the trailer relative to the vehicle. A trailer reverse assist module is constructed and arranged to receive signals from the vehicle dynamics sensors and the coupler angle detection sensor. The trailer reverse assist module is associated with the steering system for causing changes to the vehicle's steering while backing up the trailer on an intended straight line implied path. A drift controller is constructed and arranged to receive signals from the vehicle dynamics sensors. The drift controller is electrically connected with the trailer reverse assist module. When the vehicle is backing up the trailer on the intended straight line implied path and since the coupler angle sensor, detecting the zero degree angle, may not be perfectly calibrated, based on the signals from the vehicle dynamics sensors, the drift controller is constructed and arranged 1) to estimate a distance that the trailer has drifted from the straight line desired path and 2) in a closed-loop feedback manner, to provide a drift correction signal to the trailer reverse assist module for modifying a value of the zero degree angle and thus cause adjustment of the steering system to realign the trailer towards the straight line implied path without manual steering intervention.

In accordance with another aspect of an embodiment, a method is provided for backing up a trailer along a straight line implied path using a vehicle. The vehicle has a steering system, a trailer reverse assist module associated with the steering system for causing changes to the vehicle's steering while backing up the trailer, and vehicle dynamics sensors for detecting vehicle operating parameters. The method includes detecting a zero-degree angle of the trailer relative to the vehicle. The trailer reverse assist module determines if the detected zero-degree angle is substantially 0 degrees. The trailer reverse assist module receives signals from the vehicle dynamics sensors. The method provides a drift controller electrically connected with the trailer reverse assist module. The signals from the vehicle dynamics sensors are also received by the drift controller. When the vehicle is backing up the trailer intending to move the trailer along the straight line implied path and when the trailer reverse assist module determines that the relative trailer angle is substantially 0 degrees and since the zero degree angle is not detected perfectly, based in the signals from the vehicle dynamics sensors received by the drift controller, the drift controller estimates a distance that the trailer has drifted from the straight line implied path. In a closed loop feedback manner, the drift controller provides a drift correction signal to the trailer reverse assist module to modify the value of the zero degree angle and thus cause adjustment of the steering system so as to realign the trailer towards the straight line implied path without manual steering intervention.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 3:
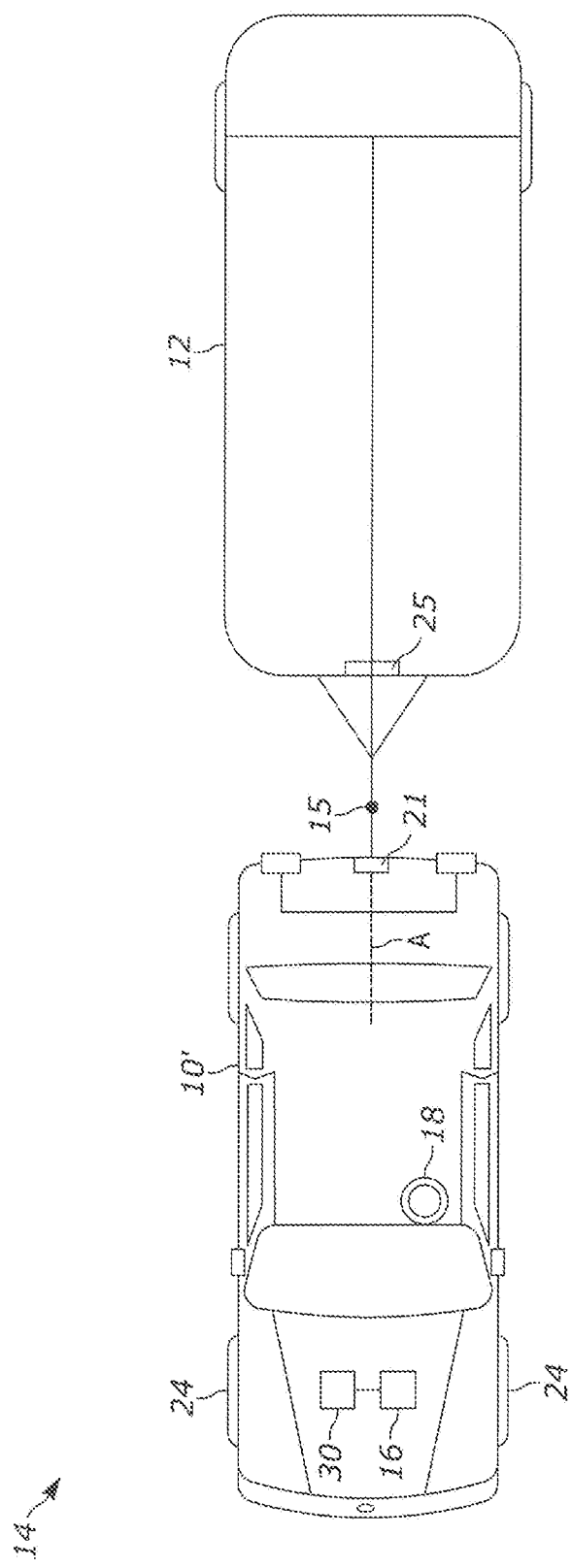
FIG. 3 is a view of a trailer reverse assist system of an embodiment showing an angle at the coupler or hitch between the vehicle and trailer being zero.
Figure 4:
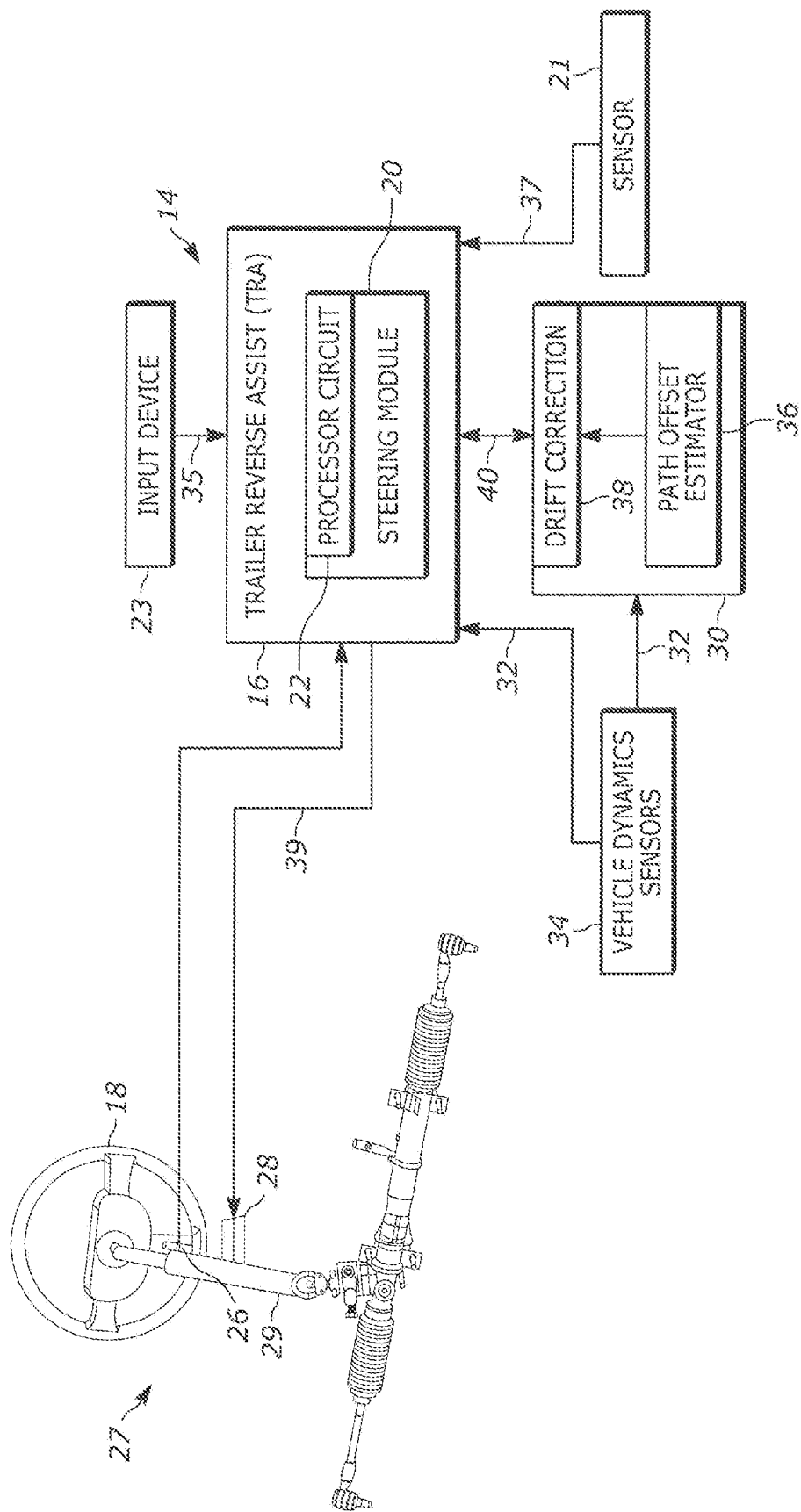
FIG. 4 is a schematic illustration of a trailer reverse assist system in accordance with an embodiment, for controlling vehicle steering and thus drift of a trailer during straight line backing thereof.

With reference to FIG. 3, a Trailer Reverse Assist (TRA) system is shown, generally indicated at 14 for assisting a vehicle 10' in backing up of a trailer 12 coupled thereto via coupler or hitch 15. The vehicle 10' includes a Trailer Reverse Assist (TRA) module 16, preferably of the type disclosed in U.S. Pat. No. 9,248,858 B2, the contents of which is hereby incorporated by reference into this specification. As best shown in FIG. 4, the TRA module 16 is an electronic control unit (ECU) including or connected with a separate vehicle steering module 20. In the embodiment, the steering wheel module 20 is shown to be part of the TRA module 16. A coupler angle detection sensor 21 and an input device 23 are connected to the TRA module 16. The sensor 21 and input device 23 may already be existing components and incorporated into the vehicle 10'. For example, the input device 23 may be a joystick controller that is used with a navigation/information system. The sensor 21 may be used to measure the coupler or hitch angle which represents relative angle between the vehicle and the trailer. The sensor 21 may be one or multiple sensors measuring relative distance between the vehicle 10' and the trailer 12 and using the varied distance to calculate hitch angle. The sensor(s) 21 may use horizontal or vertical features on the trailer 12 in the distance measurement. In the embodiment, the sensor 21 is a camera, preferably a camera which is already installed in the vehicle 10', such as a back-up camera. The camera 21 may capture an image and image analysis may be used to calculate the hitch angle. A distinct marking 25 can be established on the trailer 12 and captured by the camera 21 for analysis.

The steering module 20 includes a processor circuit 22 that is constructed and arranged to actively change a steering angle of the front axle wheels 24 (FIG. 3) without the vehicle driver giving a respective input through the vehicle steering wheel 18. The steering wheel angle is detected by a sensor 26 and the steering angle is changed via an actuator 28 coupled with the steering system 27 such as with a shaft 29 connected with the steering wheel 18 so as to provide torque to the steering wheel. The shaft 29 can be considered to be part of the steering wheel 18. The steering module 20 may also include the capability of additionally steering the rear axle wheels. With reference FIG. 4, based on signals 32 obtained from conventional vehicle dynamic sensors 34 (e.g., wheel rotations, and/or distance traveled and steering wheel angle obtained from sensor 26), a user requested steering signal 35 from the input device 23 and an observed trailer orientation signal 37 obtained from the sensor 21, the processor circuit 22 computes corrective actions to be taken and initiates, via steering output signal 30, the steering actuator 28 in order to maneuver the vehicle 10' and trailer 12 accordingly. It is noted that steering wheel angle sensor 26 can be considered to be part of the vehicle dynamics sensors.

Figure 1:
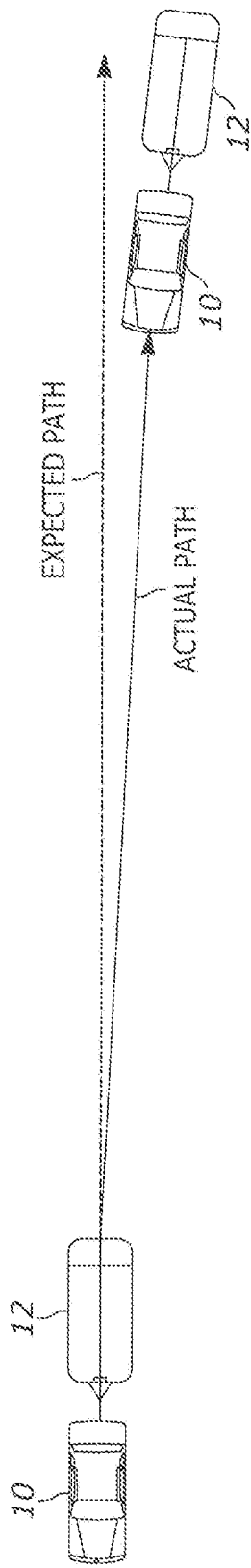
FIG. 1 is a view of a conventional vehicle equipped with a trailer and TRA system during straight line backing showing drift from an expected path.
Figure 2:
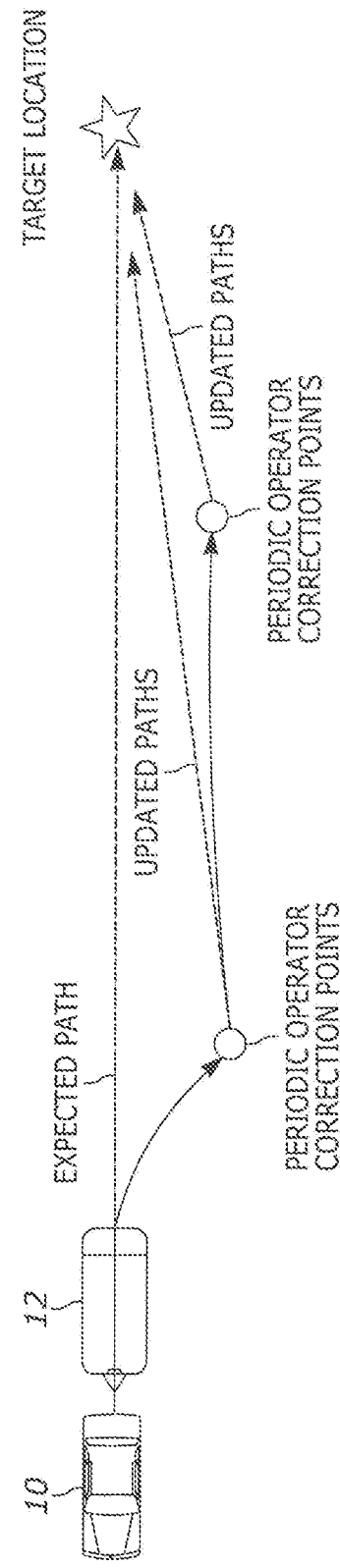
FIG. 2 is a view of the conventional vehicle, trailer, and TRA system of FIG. 1 showing periodic operator correction points to realign the drifting trailer towards a target location.

In the case when a user provides an input to the TRA module 16 for straight line backing with an aligned trailer 12 (trailer angle being approximately 0 degrees relative to the vehicle axis A), the vehicle 10' is expected to back straight up as if there was no trailer attached thereto and with the driver holding the steering wheel 18 straight. The TRA module 16 works well for its intended purpose, but, in practice, this 0 degree angle is not maintained since the trailer 12 tends to swing to one side due to small imperfections in the system alignment. The conventional TRA module 16 for straight line backing involves the vehicle steering in an attempt to keep the trailer angle sensor 21 reading zero degrees. When the value reported for 0 degree trailer angle is not perfectly calibrated (due to imprecise detection by the sensor 21), this is equivalent to connecting the trailer 12 to the vehicle 10' with a small angle error and then backing up. When this happens, the vehicle 10' turns gradually and follows the trailer 12. As noted above with regard to FIGS. 1 and 2, as a result, the reversing direction deviates slightly from the implied straight-line path.

In accordance with the embodiment, a drift controller 30 is provided as part of, or preferably connected to, the TRA module 16 to mitigate drift of the trailer 12 during straight line backing. As noted above, the vehicle 10' has a steering wheel angle sensor 26 and the vehicle can also detect the distance traveled by each road wheel individually (via sensors 34). Given this data, an estimate can be determined as to how far away the vehicle or trailer is from the implied straight line path (an imaginary line which connects the starting position and the desired final position). This estimate can be considered to be a path offset estimate. This path offset estimate can be used to instruct the steering wheel module 20 to apply torque to the steering wheel via actuator 28 to bring the vehicle or trailer back onto the implied path. This can be termed as drift correction.

Figure 5:
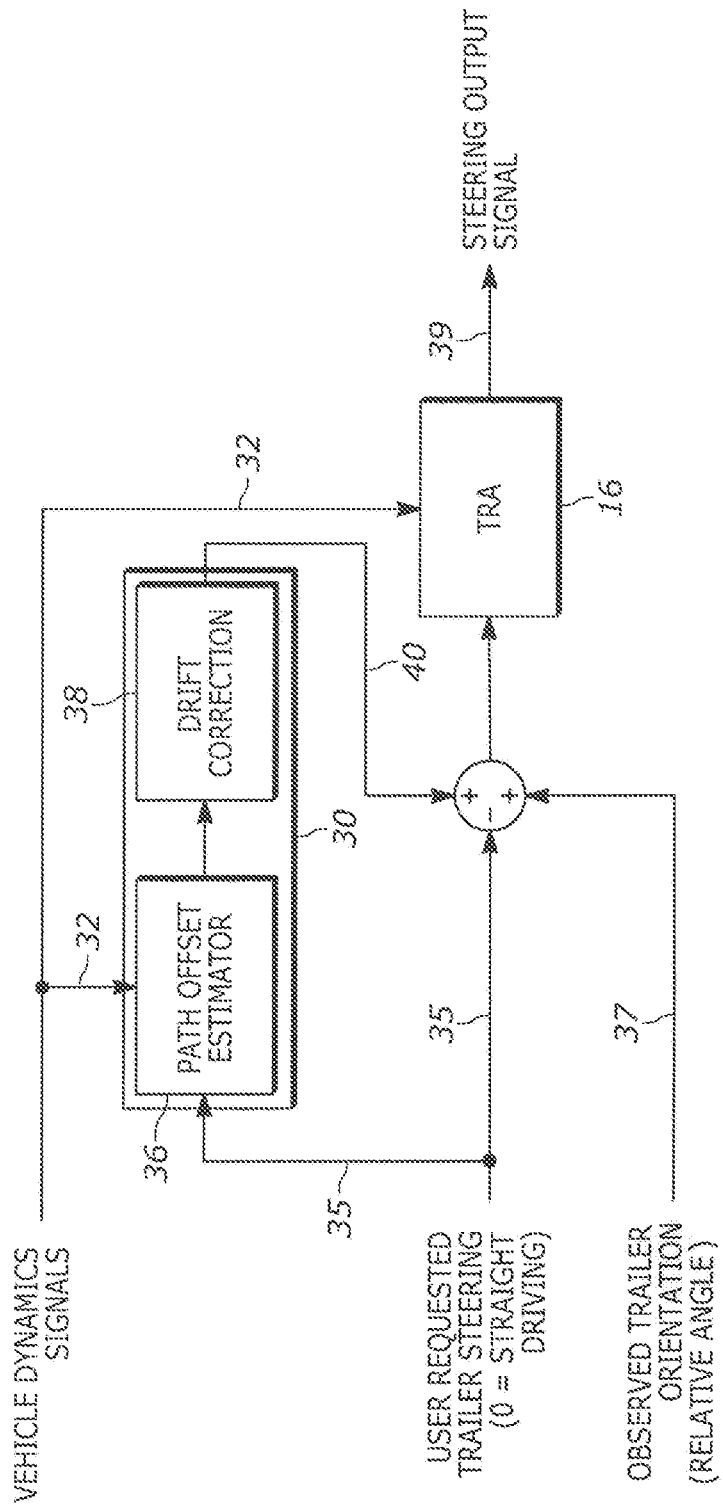
FIG. 5 is a schematic view showing inputs to the trailer reverse assist module and drift controller of FIG. 4.

With reference to FIGS. 4 and 5, in the embodiment, the drift controller 30 uses the signals 32 obtained from vehicle dynamic sensors 34 (e.g., sensing vehicle operating parameters such as wheel rotations, and/or distance traveled, with steering wheel angle obtained from sensor 26) to estimate the path offset or deviation of the trailer 12 and propose a new path (heading angle) which closes the accumulated path error without requiring user intervention. Thus, as best shown in FIG. 5, the drift controller 30 receives the same precision vehicle dynamic input signals 32 that are used to drive the TRA module 16. These input signals 32 are sufficient to estimate the deviation of the position and orientation of the vehicle 10' from the initial straight line position thereof. This deviation is then used as feedback to control the TRA module 16 to cause the vehicle 10' to realign the trailer 12 back to its original path.

The drift controller 30 can be any type of controller that sends a drift correction signal 40 as an input to the TRA module 16 for controlling the steering module 20 to cause changes to the steering system 27. The drift correction module 38 can also be employed to recalibrate or modify the value of the zero relative trailer angle in the TRA module 16. For example, drift correction module 38 may employ a proportional control feedback to the TRA module 16 such that a steady (equilibrium value) correction to the TRA module is obtained during a maneuver. The angle sensor 21 can be recalibrated (by permanently subtracting the correction from the angle sensor). Once this is done, the TRA module 16 and thus the steering module 20 will be driven exponentially back to a zero offset.

Figure 6:
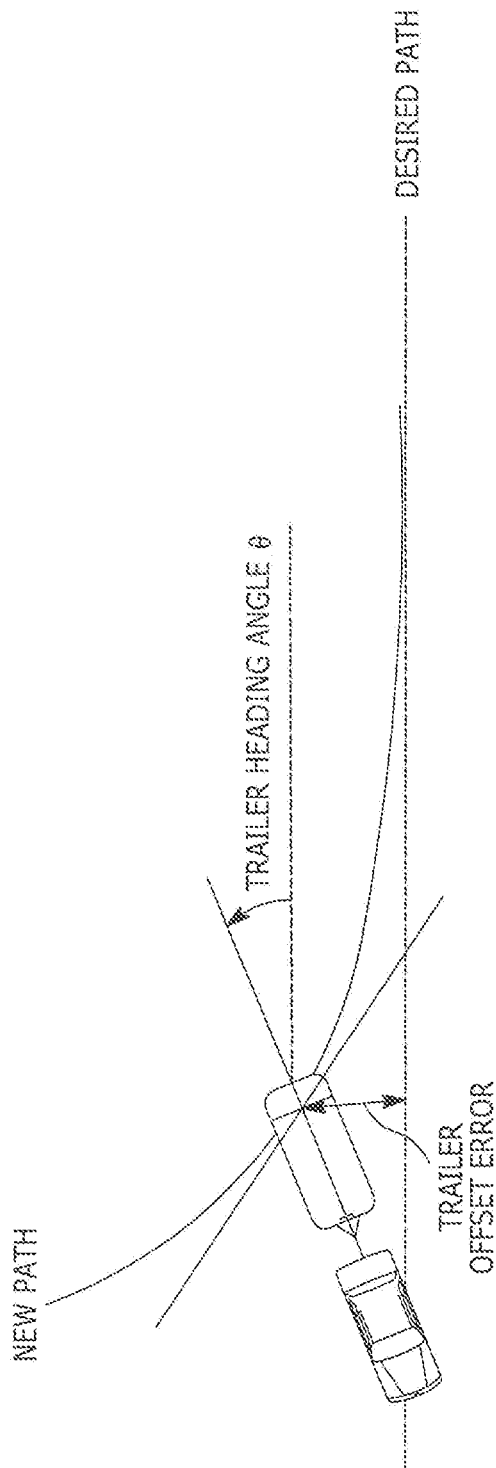
FIG. 6 is a view shown application of an exponential path correction algorithm for steering a trader towards the implied path.
Figure 7:
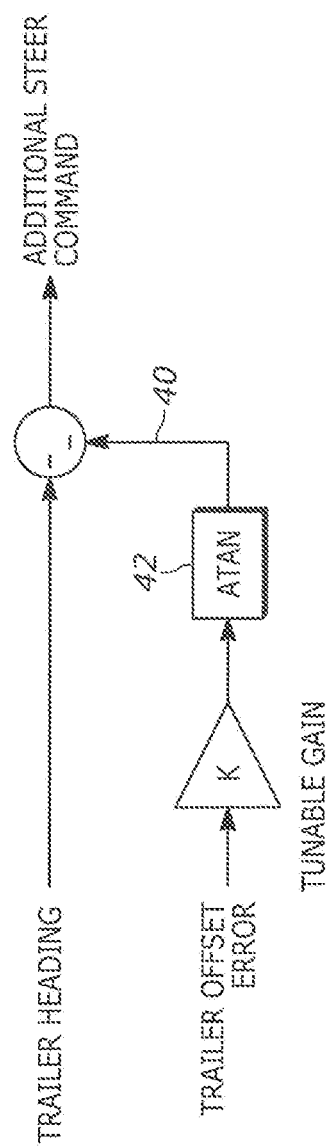
FIG. 7 shows an aTan module of the drift correction module of FIG. 5 for use in the exponential path correction algorithm of FIG. 6.

FIG. 6 shows a simple first order exponential path planner. The controller 38 constructs a smooth path which converges to the desired path and can be easily interpreted as steering commands to the TRA module 16 and does not involve excessive back and forth motions of the steering wheel 18. Thus, the proportional controller 38 relating heading angle correction per unit offset translation has an exact analytic solution and is an exponential path. With reference to FIG. 7, the controller 38 employs the arc tangent function 42 which converts slope to angle. The trailer heading should be—atan(Trailer Offset Error*K) and the trailer angle sensor 21 can have its 0 degree calibration value adjusted by exactly this amount.

Figure 8:
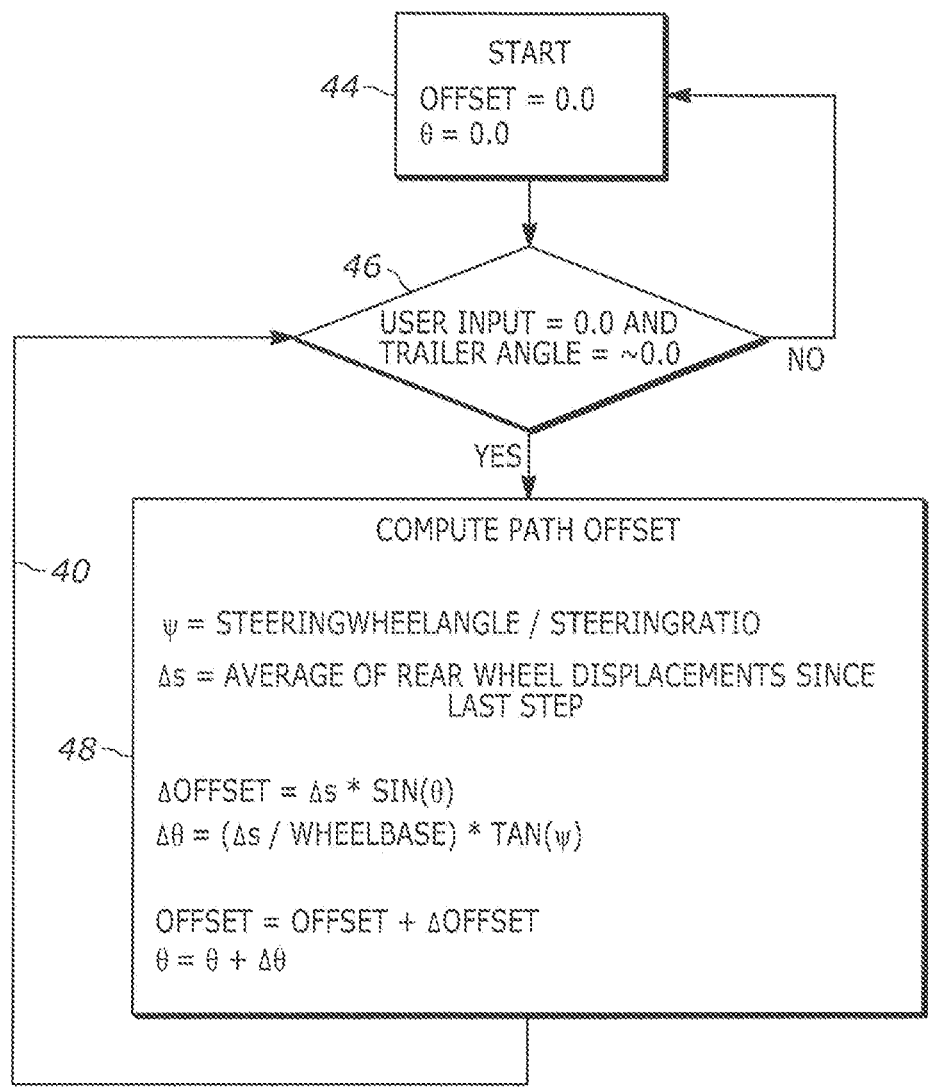
FIG. 8 is a flow diagram of steps of a method of the embodiment.

Any closed loop control scheme can be applied to correct the above-mentioned error. One example embodiment of estimating the position of the vehicle 10' is to track, via signals 32, the LEFT and RIGHT rear wheel displacement combined with the steering wheel angle signal from sensor 26, and constant steering ratio, and constant wheel base. Thus, for example, with reference to FIG. 8, the steps for performing a method of an embodiment are shown. In step 44, upon start of the routine, the path offset is assumed to be 0 and the heading angle θ is also assumed to be 0 with the vehicle orientation assumed to be along the straight line implied path. In step 46 the TRA 16 determines if the user input is 0.0 and if the trailer angle (from sensor 21) is substantially 0.0. If not, the routine returns to step 44, but if so, in step 48, the drift controller 30 (FIG. 5) calculates a path offset, for example by:

$$\psi = \text{SteeringWheelAngle}/\text{SteeringRatio}$$

$$\Delta s = \text{average of rear wheel displacements since last step}$$

$$\text{Offset} = \Delta s * \sin(\theta)$$

$$\Delta\theta = (\Delta s/\text{WheelBase}) * \tan(\psi)$$

$$\text{Offset} = \text{Offset} + \Delta\text{Offset}$$

$$\theta = \theta + \Delta\theta$$

The drift correction signal 40 from the drift controller 30 is fed back to the TRA module 16 in step 46 so as to recalibrate or modify the value of the zero relative trailer angle in the TRA module 16. Thus, there is a new offset every cycle. As shown in FIG. 5, the above calculations are executed in a processor circuit or a path offset estimator 36 of controller 30 and the result is inputted to the drift correction module 38 and then to the TRA module 16.

Thus, the TRA module 16 functions as usual when the user provides active input and the new system 14 overrides the conventional operation of the TRA module 16 and enables a more precise path following feature to back the vehicle in a perfectly straight line. Thus, employment of the drift controller 30:

detects the magnitude of the mechanical misalignment,
compensates for the mechanical misalignment using a feed-back loop, and
ensures steering the vehicle back onto the implied straight line path.

There are many different ways to achieve a similar feed-back result. Step 48 of FIG. 8 computes the offset for the center of the rear axle for the vehicle 10'. Another approach is to compute the distance offset for a different point on the vehicle 10', or a point on the trailer 12 (e.g., the center of the axle on the trailer). It is noted that speed instead of displacement measurements can be used. The yaw rate can also be used. All four conventional wheel sensors can be employed. Since the Steering Ratio is not typically constant, more exact relationships as well as geometries of the steering system and wheel slip can be employed to improve the estimate.

The operations and algorithms described herein can be implemented as executable code within the processor circuit 22 and path offset estimator 38 as described, or stored on a standalone computer or machine readable non-transitory tangible storage medium that are completed based on execution of the code by a processor circuit implemented using one or more integrated circuits. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a micro-processor circuit (not shown) and implemented using one or more integrated circuits, where execution of executable code stored in an internal memory circuit causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit can be implemented, for example, using a non-volatile memory such as a programmable read only memory (PROM) or an EPROM, and/or a volatile memory such as a DRAM, etc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A trailer reverse assist system for vehicle straight line backing-up of a trailer connected to the vehicle via a coupler, the vehicle having a steering system and vehicle dynamics sensors for detecting vehicle operating parameters, the system comprising:

a coupler angle detection sensor constructed and arranged to detect a zero degree angle of the trailer relative to the vehicle, a trailer reverse assist module constructed and arranged to receive signals from the vehicle dynamics sensors and the coupler angle detection sensor, the trailer reverse assist module being associated with the steering system for causing changes to the vehicle's steering while backing up the trailer on an intended straight line implied path, and a drift controller constructed and arranged to receive signals from the vehicle dynamics sensors, the drift controller being electrically connected with the trailer reverse assist module, wherein when the vehicle is backing up the trailer on the intended straight line implied path and since the coupler angle sensor, detecting the zero degree angle, is not perfectly calibrated, based on the signals from the vehicle dynamics sensors, the drift controller is constructed and arranged 1) to estimate a distance that the trailer has drifted from the straight line desired path and 2) in a closed-loop feedback manner, to provide a drift correction signal to the trailer reverse assist module for modifying the value of the zero degree angle and thus cause adjustment of the steering system to realign the trailer towards the straight line implied path without manual steering intervention.

2. The system of claim 1, wherein the coupler angle detection sensor is a camera.

3. The system of claim 1, further comprising the steering system, the steering system comprising:
   a steering module electrically connected with the trailer reverse assist module,
   a steering wheel,
   a steering wheel angle sensor, and
   an actuator electrically connected with the steering module and associated with the steering wheel so that based on the drift correction signal, the actuator provides torque to the steering wheel so as to change the steering wheel angle to move the trailer towards the straight line implied path.

4. The system of claim 3, further comprising the vehicle dynamic sensors, wherein vehicle dynamic sensors are constructed and arranged to obtain signals regarding the operating parameters including at least one of steering wheel angle, wheel rotations, and distance traveled.

5. The system of claim 1, wherein the drift controller comprises:
   a path offset estimator constructed and arranged to estimate a distance that the trailer has drifted from the straight line implied path, and
   a drift correction module constructed and arranged to provide the drift correction signal.

6. The system of claim 5, wherein the path offset estimator is a processor circuit.

7. The system of claim 5, wherein the drift controller includes a proportional controller.

8. The system of claim 7, wherein the proportional controller is constructed and arranged to provide the drift correction signal to the steering system to cause adjustment of the steering so as to realign the trailer along an exponential path towards the straight line implied path.

9. A method of backing up a trailer along a straight line implied path using a vehicle, the vehicle having a steering system, a trailer reverse assist module associated with the steering system for causing changes to the vehicle's steering while backing up the trailer, and vehicle dynamics sensors for detecting vehicle operating parameters, the method comprising the steps of:
   detecting a zero angle of the trailer relative to the vehicle,
   determining in the trailer reverse assist module if the relative trailer angle is substantially 0 degrees,
   receiving, at the trailer reverse assist module, signals from the vehicle dynamics sensors,
   providing a drift controller electrically connected with the trailer reverse assist module,
   receiving, at the drift controller, the signals from the vehicle dynamics sensors, and
   when the vehicle is backing up the trailer intending to move the trailer along the straight line implied path and when the trailer reverse assist module determines that the relative trailer angle is substantially 0 degrees and since the zero degree angle is not detected perfectly, based in the signals from the vehicle dynamics sensors received by the drift controller:
   estimating, in the drift controller, a distance that the trailer has drifted from the straight line implied path, and
   in a closed loop feedback manner, providing a drift correction signal to the trailer reverse assist module to recalibrate the value of the relative trailer angle and thus cause adjustment of the steering system so as to move the trailer towards the straight line implied path without manual steering intervention.

10. The method of claim 9, wherein the drift controller includes a proportional controller and the drift correction signal causes adjustment of the steering so as to move the trailer along an exponential path towards the straight line implied path.

* * * * *